(12) United States Patent
Trinkenschuh et al.

(10) Patent No.: US 11,465,610 B2
(45) Date of Patent: Oct. 11, 2022

(54) DRIVE UNIT AND DRIVE ARRANGEMENT

(71) Applicant: Schaeffler Technologies AG & Co. KG, Herzogenaurach (DE)

(72) Inventors: Andreas Trinkenschuh, Bühl (DE); Steffen Lehmann, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 128 days.

(21) Appl. No.: 16/973,449

(22) PCT Filed: May 29, 2019

(86) PCT No.: PCT/DE2019/100477
§ 371 (c)(1),
(2) Date: Dec. 9, 2020

(87) PCT Pub. No.: WO2019/242798
PCT Pub. Date: Dec. 26, 2019

(65) Prior Publication Data
US 2021/0245730 A1    Aug. 12, 2021

(30) Foreign Application Priority Data
Jun. 20, 2018   (DE) .......................... 102018114782.1

(51) Int. Cl.
*B60W 20/40*   (2016.01)
*B60K 1/02*   (2006.01)
(Continued)

(52) U.S. Cl.
CPC .............. *B60W 20/40* (2013.01); *B60K 1/02* (2013.01); *B60K 6/24* (2013.01); *B60K 6/26* (2013.01);
(Continued)

(58) Field of Classification Search
CPC ...... B60W 20/10; B60W 20/16; B60W 20/17; B60W 20/40; B60L 15/10; B60L 15/20
See application file for complete search history.

(56) References Cited

U.S. PATENT DOCUMENTS 8,585,522 B2 * 11/2013 Kaltenbach ........... B60W 10/06
475/5
11,168,597 B2 * 11/2021 Fukuda ..................... F01N 9/00
(Continued)

FOREIGN PATENT DOCUMENTS

DE          19709457 A1    9/1998
DE    102015222690 A1    5/2017
(Continued)

OTHER PUBLICATIONS

Unpublished Patent Application DE102017128289.0.

*Primary Examiner* — Jeffrey J Restifo

(57) ABSTRACT

A drive unit for a powertrain of an electrically drivable motor vehicle, in particular a hybrid motor vehicle, is equipped with a first electric machine as well as a second electric machine and a first shaft as well as an output shaft. The drive unit furthermore has a separating clutch and a connection element for connection for conjoint rotation of an internal combustion engine, and wherein at least the first electric machine is operated in generator mode and the nominal rpm $n_1$ of the first electric machine has the following relationship to the nominal rpm $n_2$ of the second electric machine:

$n_1 > 1.2 \times n_2$.

11 Claims, 1 Drawing Sheet

(51) Int. Cl.

| | | |
|---|---|---|
| *B60K 6/24* | (2007.10) | |
| *B60K 6/26* | (2007.10) | |
| *B60K 6/36* | (2007.10) | |
| *B60K 6/38* | (2007.10) | |
| *B60K 6/547* | (2007.10) | |
| *B60K 11/00* | (2006.01) | |
| *B60W 20/30* | (2016.01) | |

(52) U.S. Cl.
CPC ............... *B60K 6/36* (2013.01); *B60K 6/38* (2013.01); *B60K 6/547* (2013.01); *B60K 11/00* (2013.01); *B60W 20/30* (2013.01); *B60K 2006/266* (2013.01); *B60K 2006/268* (2013.01); *B60Y 2200/92* (2013.01)

(56) References Cited

U.S. PATENT DOCUMENTS

| | | | | |
|---|---|---|---|---|
| 2010/0170732 | A1* | 7/2010 | Glaser | B60K 6/26 180/65.245 |
| 2010/0197452 | A1* | 8/2010 | Kaltenbach | B60W 20/40 477/14 |
| 2010/0227733 | A1* | 9/2010 | Kaltenbach | B60W 30/18054 477/4 |
| 2011/0130912 | A1* | 6/2011 | Allgaier | B60K 6/48 903/902 |
| 2012/0129650 | A1* | 5/2012 | Lemp | B60W 20/00 903/902 |
| 2012/0208672 | A1* | 8/2012 | Sujan | B60W 30/188 180/65.265 |
| 2016/0031431 | A1* | 2/2016 | Johri | B60W 20/15 180/65.265 |
| 2016/0137191 | A1* | 5/2016 | Bang | B60W 20/40 180/65.265 |
| 2016/0144740 | A1* | 5/2016 | Heap | B60W 30/20 180/65.265 |
| 2016/0207525 | A1* | 7/2016 | Nefcy | B60K 6/445 |
| 2017/0158043 | A1* | 6/2017 | Tsukamoto | B60K 6/442 |
| 2018/0162355 | A1* | 6/2018 | Colavincenzo | B60W 20/13 |
| 2018/0162369 | A1* | 6/2018 | Colavincenzo | F16D 48/06 |
| 2018/0162372 | A1* | 6/2018 | Colavincenzo | B60L 58/20 |
| 2018/0162382 | A1* | 6/2018 | Colavincenzo | B60W 10/30 |
| 2018/0186361 | A1* | 7/2018 | Zhang | B60L 50/15 |
| 2018/0281778 | A1* | 10/2018 | Zhang | B60K 6/48 |
| 2018/0320784 | A1* | 11/2018 | Lampe | B60W 20/40 |
| 2020/0010089 | A1* | 1/2020 | Ford | B60W 10/10 |
| 2020/0247239 | A1* | 8/2020 | Stoltz | B60W 10/06 |
| 2021/0207666 | A1* | 7/2021 | Bucknor | B60W 10/08 |
| 2021/0245730 | A1* | 8/2021 | Trinkenschuh | B60K 6/40 |
| 2022/0094297 | A1* | 3/2022 | Lacaux | B60L 15/20 |
| 2022/0097530 | A1* | 3/2022 | Gagas | B60L 50/66 |

FOREIGN PATENT DOCUMENTS

| | | |
|---|---|---|
| DE | 102015222691 A1 | 5/2017 |
| DE | 102015222692 A1 | 5/2017 |
| DE | 102015222694 A1 | 5/2017 |
| DE | 102017127695 A1 | 5/2019 |
| EP | 1954515 B1 | 7/2009 |
| JP | 2013121788 A | 6/2013 |
| WO | 2017084887 A1 | 5/2017 |
| WO | 2017084888 A1 | 5/2017 |
| WO | 2017084889 A1 | 5/2017 |

\* cited by examiner

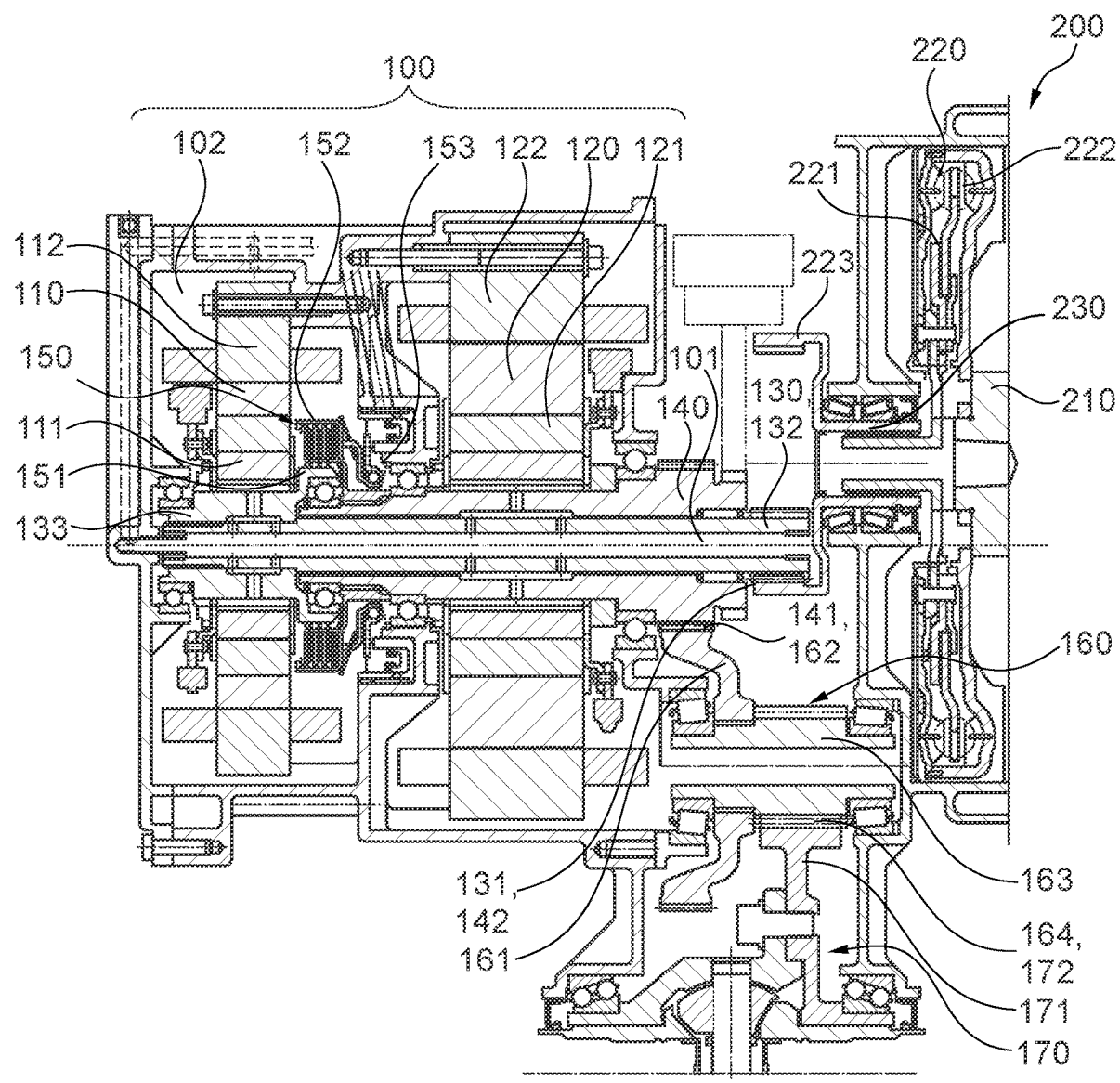

DRIVE UNIT AND DRIVE ARRANGEMENT

CROSS-REFERENCE TO RELATED APPLICATIONS

This application is the U.S. National Phase of PCT Appln. No. PCT/DE2019/100477 filed May 29, 2019, which claims priority to DE 10218114782.1 filed Jun. 20, 2018, the entire disclosures of which are incorporated by reference herein.

TECHNICAL FIELD

The disclosure relates to a drive unit for a powertrain of an electrically drivable motor vehicle, in particular of a hybrid motor vehicle, as well as to a drive arrangement having a drive unit according to the disclosure.

BACKGROUND

Drive devices for a hybrid vehicle are known from the prior art, which include, inter alia, an internal combustion engine, a first electric machine and a second electric machine.

DE 10 2015 222 690 A1, DE 10 2015 222 691 A1, and WO 2017 084 887 A1 describe methods for controlling such a drive device, the drive device being operable in several operating modes.

DE 10 2015 222 690 A1 explains mainly a serial hybrid operation in which the traction drive torque is provided by the second electric machine and the internal combustion engine drives the first electric machine to generate electrical energy. The internal combustion engine operation at an operating point is described, wherein a combined efficiency of the drive device depends on the efficiency of the internal combustion engine and on the efficiency of the first electric machine.

In the documents DE 10 2015 222 691 A1 and WO 2017 084 887 A1, a performance-oriented and a consumption-oriented mode are described, wherein each mode is dependent on a condition. This condition is that a target drive value is increased to an intermediate value which lies between an internal combustion engine threshold representing a maximum drive value in a parallel hybrid mode, in which only the internal combustion engine produces a traction drive torque, and a parallel hybrid mode threshold, representing a maximum drive value in the parallel boost hybrid operation.

DE 10 2015 222 692 A1, WO 2017 084 888 A1, DE 10 2015 222 694 A1, and WO 2017 084 889 A1 describe a method for operating a drive device of a hybrid vehicle for driving a drive wheel, wherein the drive device comprises an internal combustion engine, a first electric machine coupled with the internal combustion engine, a second electric machine, an electric rechargeable battery, and a main clutch between the internal combustion engine and the drive wheel.

DE 10 2015 222 692 A1 and WO 2017 084 888 A1, describe that the drive device is operated in one of three operating modes, namely in a purely electric operation, a serial hybrid operation, or a parallel hybrid operation, wherein the traction drive torque provided during the change from the first operating mode to the second operating mode corresponds to a suitably selectable course between the traction drive torque provided before and after the change.

DE 10 2015 222 694 A1 and WO 2017 084 889 A1 disclose that a transmission is also arranged between the internal combustion engine and the drive wheel.

Furthermore, a cited document describes a hybrid vehicle which has a hybrid drive device.

The hybrid vehicle described repeatedly in the prior art comprises an internal combustion engine, a first and a second electric machine, at least one drive wheel, and a main clutch as well as a first and a second clutch. The main clutch is arranged between the internal combustion engine and a drive wheel, the first clutch is provided between the first electric machine and an output shaft of the internal combustion engine, and the second clutch is provided between the second electric machine and a drive wheel.

DE 10 2017 128 289.0 (not yet published) discloses a drive unit which is for a powertrain of a hybrid motor vehicle and has an internal combustion engine, a first electric machine, a second electric machine, a first transmission stage, and a drive shaft of the first electric machine and/or the second electric machine. Furthermore, the drive unit comprises a transmission subassembly, by means of which the drive shaft of the respective electric machine is coupled or couplable to wheel drive shafts. A second transmission stage is coupled to a layshaft unit, wherein the layshaft unit has an integrated clutch and is thus further connected to the wheel drive shafts such that the internal combustion engine is couplable to the wheel drive shafts via the second transmission stage, depending on the position of this clutch.

The likewise not yet published DE 10 2017 127 695.5 teaches a powertrain which is for a hybrid motor vehicle and has a transmission input shaft which is operatively connected to a first electric machine and an internal combustion engine via a first partial powertrain so as to transmit torque and which is operatively connected to a second electric machine via a second partial powertrain so as to transmit torque. The second electric machine is permanently connected to the transmission input shaft so as to transmit torque and the first electric machine and the internal combustion engine can be connected to the transmission input shaft in a couplable manner so as to transmit torque. The first electric machine and/or the second electric machine can be designed to be cooled. It is particularly preferred if the cooling is implemented by means of water cooling from a vehicle cooling circuit or by means of oil cooling with transmission oil from the transmission. Furthermore, the separating clutch used can also be designed as an oil-cooled multi-plate clutch.

SUMMARY

The object of the present disclosure is to provide a drive unit for a powertrain of an electrically drivable motor vehicle, in particular a hybrid motor vehicle, as well as a drive arrangement equipped therewith, which combine energetically optimal generator operation with a small installation space requirement.

The object is achieved by the drive unit according to the disclosure following description. Advantageous embodiments of the drive unit are specified in the claims and embodiments described herein. In addition, a drive arrangement for a motor vehicle having the drive unit is provided in the following description.

The features of the claims may be combined in any technically useful way, including the explanations given in the following description and features of the figures, which comprise additional embodiments of the disclosure.

In connection with the present disclosure, the terms "coaxial" and "radial" always refer to the axis of rotation of the drive unit.

The disclosure relates to a drive unit for a powertrain of an electrically drivable motor vehicle, in particular a hybrid motor vehicle, having a first electric machine as well as a second electric machine and a first shaft as well as an output shaft. The rotor of the first electric machine is connected for conjoint rotation to the first shaft and the rotor of the second electric machine is connected for conjoint rotation to the output shaft. The drive unit also has a separating clutch with which a rotor of the first electric machine is connectable or connected to the output shaft for the purpose of torque transmission.

In addition, the drive unit further comprises a connection element which is connected to an output element of the internal combustion engine. This connection element is used to connect an internal combustion engine. At least the first electric machine is operable in general operation and the nominal rpm $n_1$ of the first electric machine has the following relationship to the nominal rpm $n_2$ of the second electric machine:

$$n_1 > 1.2 \times n_2.$$

In a particular embodiment, it is provided that the ratio is $n_1 > 1.5 \times n_2$.

This ensures that the first electric machine is designed for a higher rpm and consequently for a lower torque than the second electric machine. Accordingly, electrical energy can be efficiently generated with the first electric machine in generator mode at a relatively high rpm, whereas the second electric machine is set up to generate a relatively high torque at a lower rpm compared to the first electric machine for the purpose of driving a vehicle equipped therewith.

It is provided in particular that the two electric machines are arranged in series. In a preferred embodiment it is provided that the rotors of the two electric machines or their axes of rotation are arranged coaxially.

The separating clutch is a switchable clutch that can be switched from an open state to a closed state and vice versa.

The separating clutch can be designed both as "normally open" (initial state open) but also as "normally closed" (initial state closed).

An advantageous or preferred embodiment of the separating clutch is normally open.

The drive unit can be designed such that the first shaft, fixedly connected to the rotor of the first electric machine, is arranged radially inside the output shaft, fixedly connected to the rotor of the second electric machine.

The first shaft can be designed to be divided, namely in the form of a centrally extending hollow shaft on which a hub, connected for conjoint rotation, is arranged in some areas, which in turn is connected for conjoint rotation to the rotor of the first electric machine.

The radial inner side of the separating clutch can be connected for conjoint rotation to the hub on the first electric machine, and the radial outer side of the separating clutch can be connected to the output shaft, which is connected for conjoint rotation to the rotor of the second electric machine.

According to a further embodiment of the disclosure, a first transmission stage is realized in the drive unit, wherein the first transmission stage has a gear transmission ratio of $i<1$, in particular $i<0.8$.

This translates an applied rpm of a connected internal combustion engine to high rpm, corresponding to the first electric machine set up for high rpm in generator mode.

According to a further advantageous embodiment, the first electric machine has a smaller radial extent than the second electric machine.

This means that the stator has a smaller outside diameter than the stator of the second electric machine, with an essentially round cross section of the electric machine.

In addition, the drive unit has power electronics and/or at least part of a cooling device or the lubricating device of the drive unit, which is arranged radially next to the first electric machine.

This arrangement of individual units of the drive unit is possible because the first electric machine is relatively small radially and thus provides additional installation space, which enables the arrangement of further components, such as the power electronics or a part of the cooling device or the lubricating device.

In addition, the subject matter according to the disclosure is preferably implemented such that the first transmission stage is formed by the connection element, which comprises an internally toothed gear, and the first shaft, which has an external toothing. The two toothings mesh with one another for the purpose of transmitting the rotary motion from the connection element to the first shaft.

The axis of rotation of the rotor of the first electric machine and the axis of rotation of the internal combustion engine or its output element are arranged laterally offset.

According to a further embodiment, the separating clutch is arranged between the first electric machine and the second electric machine in the axial direction. In a preferred embodiment, the separating clutch is a multi-plate clutch.

According to the disclosure, the nominal torque M1 of the first electric machine has the following relationship to the nominal torque M2 of the second electric machine:

$$M1/M2 < 0.4$$

In a further advantageous embodiment of the drive unit, it is provided that the drive unit has a second transmission stage, which is formed by a toothing, in particular an external toothing, of the output shaft and a first gearwheel, meshing with the toothing of the output shaft, and realizes a gear transmission ratio of $i>1$ of the rpm of the output shaft.

The output shaft can itself form the toothing, or it can be connected for conjoint rotation to one.

Furthermore, the drive unit can have a transmission which is in operative connection with the output shaft of the drive unit, also referred to as the transmission input shaft, so that a torque provided by the output shaft or the rotary motion realized by the output shaft can be stepped up or stepped down by means of the transmission and transmitted to a further transmission unit of a motor vehicle, or can also be transmitted directly to the drive wheels of a motor vehicle.

This transmission can comprise a differential transmission in the output area or be designed as such.

The first gear can be coupled for conjoint rotation to a through-drive countershaft of the transmission, the external toothing of which in turn meshes with an input gearwheel of a differential transmission, thereby realizing a third transmission stage.

The drive unit according to the disclosure has the advantage that, by means of a high-revving first electric machine, which is coupled to the internal combustion engine by means of the first transmission stage, the internal combustion engine can be operated in a low rpm range and consequently with optimal efficiency, which in turn reduces $CO_2$ emissions as well as noise emissions. Furthermore, the first electric machine, constructed radially smaller, can save costs and installation space can be used for other components, such as power electronics and/or at least part of a cooling device or lubricating device of the drive unit.

In addition, according to the disclosure, a drive arrangement is provided, having a drive unit and an internal combustion engine, wherein the internal combustion engine is coupled for conjoint rotation or couplable to the rotor of the first electric machine via the connection element by means of an output element of the internal combustion engine.

In a further embodiment, the drive arrangement also comprises at least one wheel drive shaft, which is connected to the output shaft of the drive unit via the transmission, so that a rotary motion realized by the output shaft can be transmitted to the wheel drive shaft by the transmission.

In an advantageous embodiment of the drive arrangement, the internal combustion engine has an optimal rpm range of 2000 $min^{-1}$ to 4000 $min^{-1}$.

When operating a motor vehicle, in particular a hybrid vehicle, with a drive arrangement according to the disclosure, comprising a drive unit according to the disclosure and an internal combustion engine, the following driving operating modes are enabled:

Electric driving and recuperation:
  The separating clutch is open, as a result of which the second electric machine is decoupled from the first electric machine and the internal combustion engine. The second electric machine is thus controlled separately as a traction machine and as a generator. The internal combustion engine and the first electric machine are not in operation.

Serial driving and charging:
  The separating clutch is open. The internal combustion engine is started by means of the first electric machine, wherein the internal combustion engine can drive the first electric machine and, consequently, the first electric machine is controlled as a generator in order to charge the battery of the motor vehicle. The second electric machine is controlled as a traction machine, wherein it can be supported by the internal combustion engine.

Parallel hybrid drive, charging, and boosting:
  The separating clutch is closed, as a result of which the first electric machine, the second electric machine, and the internal combustion engine are coupled to one another. The motor vehicle is driven by means of the internal combustion engine and/or one or both electric machines. The two electric machines can be controlled here as a traction machine or as a generator.

Because the internal combustion engine is connected, via the first transmission stage, to the first electric machine operated as a generator, the internal combustion engine can be operated at low rpm and consequently energetically efficiently, while the generator can be operated energetically efficiently in higher rpm ranges.

BRIEF DESCRIPTION OF THE DRAWINGS

The disclosure described above is explained in detail below based on the relevant technical background with reference to the associated drawing, which shows preferred embodiments. The disclosure is in no way restricted by the purely schematic drawing, wherein it should be noted that the embodiment shown in the drawing is not limited to the dimensions shown. In the figure:

The figure shows a drive unit according to the disclosure in sectional view.

DETAILED DESCRIPTION

The figure shows a drive unit 100 according to the disclosure for a powertrain of an electrically drivable motor vehicle, in particular a hybrid motor vehicle, having a first electric machine 110 as well as a second electric machine 120, both of which are arranged on a common axis of rotation 101. The rotor 111 of the first electric machine 110 is arranged coaxially to the axis of rotation 101 and also to the rotor 121 of the second electric machine 120.

The stator 112 of the first electric machine 110 as well as the stator 122 of the second electric machine 120 are accommodated in a housing 102 of the drive unit 100. The rotor 111 of the first electric machine is connected for conjoint rotation to a first shaft 130 for conjoint rotation. The rotor 121 of the second electric machine 120 is for conjoint rotation to an output shaft 140, which can also be referred to as a transmission input shaft.

Furthermore, the drive unit 100 comprises a separating clutch 150, by means of which the first electric machine 110, and thus an internal combustion engine connected for conjoint rotation to the first shaft 130, connected to the rotor 111 of the first electric machine 110, is connectable or connected to the output shaft for the purpose of torque transmission.

In the embodiment depicted here, the first shaft 130 is designed in two parts, namely from a centrally extending hollow shaft 132 as well as a hub 133, positioned on this hollow shaft 132 and connected for conjoint rotation thereto, wherein the hub 133 is in turn fixedly connected to the rotor 111 of the first electric machine 110.

The hub 133 forms the radial inner side 151 of the separating clutch 150 or is fixedly connected to this input side of the separating clutch 150.

The radial outer side 152 of the separating clutch 150, which realizes the output side of the separating clutch 150, is connected for conjoint rotation to the output shaft 140.

The separating clutch 150 is a switchable clutch that can be switched from an open state to a closed state and vice versa. For this purpose, the separating clutch 150 is assigned an actuation system 153.

In this manner, when the separating clutch 150 is closed, a torque can be transmitted from the first shaft 130 to the output shaft 140 or vice versa.

In the embodiment depicted here, it is thus provided that the two electric machines 110, 120 are arranged in series, wherein the rotors 111, 121 of the two electric machines 110, 120 or their axes of rotation are arranged coaxially. The first shaft 130 or its centrally extending hollow shaft 132 extends radially inside the output shaft 140, whereby the overall installation volume required for the drive unit 100 can be made small.

Furthermore, the drive unit 100 depicted here comprises a transmission 160, which is in operative connection with the output shaft 140 of the drive unit 100, also referred to as the transmission input shaft, so that a torque provided by the output shaft 140 or the rotary motion realized by the output shaft 140 can be stepped up or stepped down by means of the transmission 160 and transmitted to a further transmission unit of a motor vehicle, or can also be transmitted directly to the drive wheels of a motor vehicle.

In the embodiment depicted here, this transmission 160 comprises a differential transmission 170. Furthermore, the transmission 160 comprises a first gearwheel 161, which meshes with an external toothing 141 on the output shaft 140. A second transmission stage 162 is thus implemented in the drive unit 100 by the first gearwheel 161. This first gearwheel 161 is coupled for conjoint rotation to a through-drive countershaft 163 of the transmission 160, the external toothing 164 of which in turn meshes with an input gearwheel 171 of the differential transmission 170, whereby a third transmission stage 172 is realized.

The drive unit 100 is part of a likewise depicted embodiment of a drive arrangement 200 according to the disclosure.

This drive arrangement 200 furthermore has an internal combustion engine, not shown here, which, when connected to the connection 210 shown, is coupled for conjoint rotation to the rotor 111 of the first electric machine 110 via the first shaft 130 or —with the interposition of a further coupling— is couplable thereto.

The depicted drive arrangement 200 is designed such that a first transmission stage 142 is formed between the connection 210 for an internal combustion engine, not shown here, and the first shaft 130, which is connected for conjoint rotation to the rotor 111 of the first electric machine 110, for the purpose of translating the rpm of the rotary motion realized by the internal combustion engine or its connection 210 to the first shaft 130.

For this purpose, an output element 220 of the internal combustion engine is provided, which can have a damper unit 221 or also a clutch 222 for opening and closing the torque transmission path between the internal combustion engine and the drive unit 100, or also a combination shown of a damper unit 221 and a clutch 222.

Furthermore, the output element 220 is connected to an internally toothed gearwheel 223, which is embodied as a component of the connection element 230, which meshes with an external toothing 131 of the first shaft 130 and thus realizes a first transmission stage 142.

It can be seen that in the exemplary embodiment depicted here, an axis of rotation of the output element 220 is laterally offset from the axis of rotation 101 of the drive unit 100.

In this manner, a rotary motion generated by the internal combustion engine, not shown here, can be transmitted to the first shaft 130 via the output element 220, the connection element 230, and the first transmission stage 142 so that the rotor 111 of the first electric machine 110 located thereon can be set in rotary motion in order to be operated as a generator.

When the separating clutch 150 closes, the applied rotary motion can be transmitted from the first shaft 130, optionally enhanced by an electric motor drive by the first electric machine 110, to the output shaft 140. Due to the connection for conjoint rotation of the rotor 122 of the second electric machine 120 to the output shaft 140, a torque provided by the second electric machine 120 can also be applied to the output shaft 140.

Alternatively, when the separating clutch 150 is opened, only the second electric machine 120 can be operated alone in order to rotate the output shaft 140.

The rotary motion of the output shaft 140 is transmitted, via its external toothing 141, to the first gearwheel 161 of the connected transmission 160, whereby the second transmission stage 162 is realized.

The torque or the rotary motion is transmitted from the first gear 161 to the through-drive countershaft 163, from which it is transmitted to the differential transmission 170 via the input gear 171.

The torque is transmitted from the differential transmission 170 to the wheel drive shafts, not shown here, or, if needed, to a further transmission for stepping up or stepping down the torque or the rpm.

The depicted drive arrangement 200 allows realizing a wide variety of driving states, such as operating the internal combustion engine alone to drive a motor vehicle, or also with the addition of the second electric machine 120 and/or the first electric machine 110, as well as a simultaneous generator operation of the first electric machine 110 during operation of the internal combustion engine and/or the second electric machine 120, as well as a sole operation of the second electric machine 120, or also a recuperation operation of the first electric machine 110 and/or of the second electric machine 120.

At least the first electric machine 110 can be operated in generator mode, with the nominal rpm $n_1$ of the first electric machine 110 having the following relationship to the nominal rpm $n_2$ of the second electric machine 120:

$$n_1 > 1.2 \times n_2$$

The connection element 230 coupled to the output element 220, which is used to connect an internal combustion engine, not shown here, is clearly designed with a larger diameter than the external toothing 131 of the first shaft 130 so that the first transmission stage 142 realized thereby translates the rpm of the output element 220 to a higher rpm. Accordingly, the first electric machine 110 can be operated as a generator in an optimal rpm range.

With the drive unit proposed here and the drive arrangement equipped therewith, devices are provided which combine energetically optimal generator operation with a small installation space requirement.

LIST OF REFERENCE NUMBERS

100 Drive unit
101 Axis of rotation
102 Housing of the drive unit
110 First electric machine
111 Rotor of the first electric machine
112 Stator of the first electric machine
120 Second electric machine
121 Rotor of the second electric machine
122 Stator of the second electric machine
130 First shaft
131 External toothing of the first shaft
132 Centrally extending hollow shaft
133 Hub
140 Output shaft
141 External toothing of the output shaft
142 First transmission ratio
150 Separating clutch
151 Radial inner side of the separating clutch
152 Radial outer side of the separating clutch
153 Actuation system
160 Transmission
161 First gearwheel
162 Second transmission stage
163 Through-drive countershaft
164 External toothing of the through-drive countershaft
170 Differential transmission
171 Input gearwheel
172 Third transmission stage
200 Drive arrangement
210 Connection for an internal combustion engine
220 Output element
221 Damper unit
222 Clutch
223 Internally toothed gearwheel

The invention claimed is:

1. A drive unit for a powertrain of an electrically drivable motor vehicle, the drive unit comprising:
a first electric machine having a rotor;
a second electric machine having a rotor;
a first shaft;
an output shaft, wherein the rotor of the first electric machine is connected for conjoint rotation to the first shaft and the rotor of the second electric machine is connected for conjoint rotation to the output shaft; and a separating clutch with which the rotor of the first electric machine is connectable to the output shaft for torque transmission, wherein the drive unit also has a connection element for connecting an internal combustion engine, wherein the first electric machine is operable in generator mode and a nominal rpm $n_1$ of the first electric machine has the following relationship to a nominal rpm $n_2$ of the second electric machine:

$$n_1 > 1.2 \times n_2.$$

2. The drive unit according to claim 1, further comprising a first transmission stage, wherein the first transmission stage has a gear transmission ratio of i<1.

3. The drive unit according to claim 2, wherein the first transmission stage is formed by the connection element, which comprises an internally toothed gearwheel, and the first shaft, which has external toothing, wherein the two toothings mesh with one another for the purpose of transmitting a rotary motion from the connecting element to the first shaft.

4. The drive unit according to claim 2, further comprising a second transmission stage, which is formed by a toothing of the output shaft and a first gearwheel, meshing with the toothing of the output shaft, and realizes a gear transmission ratio of i >1 of an rpm of the output shaft.

5. The drive unit according to claim 1, wherein the first electric machine has a smaller radial extent than the second electric machine.

6. The drive unit according to claim 5, wherein power electronics and at least part of a cooling device of the drive unit is arranged radially next to the first electric machine.

7. The drive unit according to claim 1, wherein the separating clutch is arranged between the first electric machine and the second electric machine in an axial direction, wherein the separating clutch is a multi-plate clutch.

8. The drive unit according to claim 1, wherein a nominal torque M1 of the first electric machine has the following relationship to a nominal torque M2 of the second electric machine:

$$M1/M2 < 0.4$$

9. A drive arrangement having a drive unit according to claim 1, wherein the internal combustion engine is configured to be couplable for conjoint rotation, via the connection element, to the rotor of the first electric machine by an output element of the internal combustion engine.

10. The drive arrangement according to claim 9, wherein the internal combustion engine has an optimal rpm range of 2000 $min^{-1}$ to 4000 $min^{-1}$.

11. The drive unit according to claim 1, further comprising a first transmission stage, wherein the first transmission stage has a gear transmission ratio of i<0.8.

* * * * *